No. 871,351. PATENTED NOV. 19, 1907.
C. J. MALINGS.
RESILIENT VEHICLE WHEEL.
APPLICATION FILED JULY 30, 1906.

3 SHEETS—SHEET 1.

Witnesses:
Edw. Lindenmueller.
Harry T. Gettins.

Inventor:
Charles J. Malings
By Oto L. Billman
His Attorney.

No. 871,351. PATENTED NOV. 19, 1907.
C. J. MALINGS.
RESILIENT VEHICLE WHEEL.
APPLICATION FILED JULY 30, 1906.
3 SHEETS—SHEET 2.
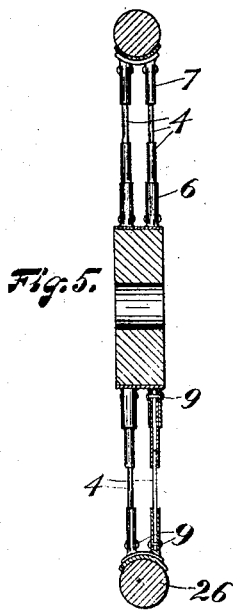
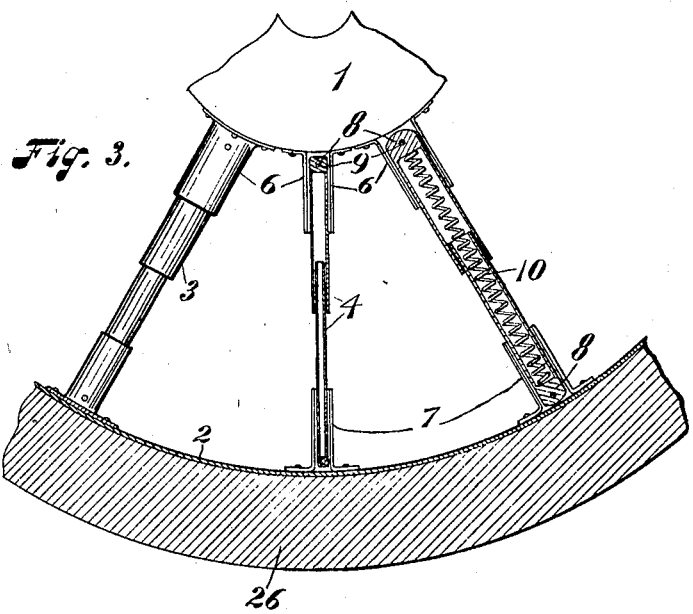
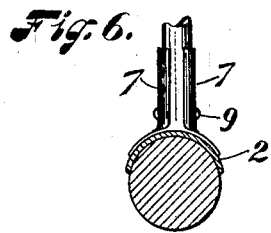
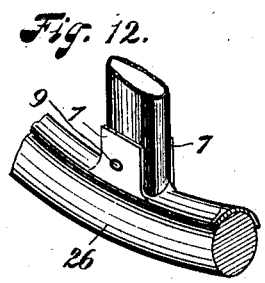
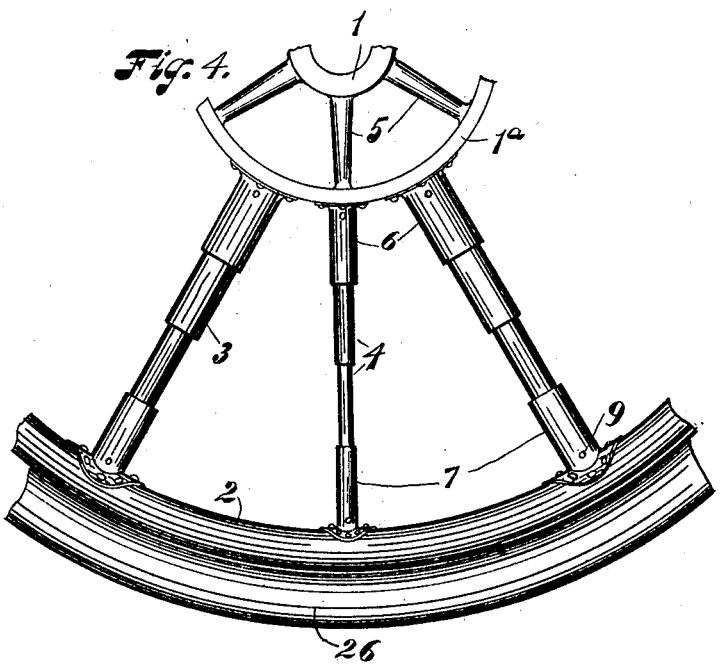
Witnesses:
Edw. Lindemuller.
Harry T. Gettins.
Inventor:
Charles J. Malings
By
His Attorney.

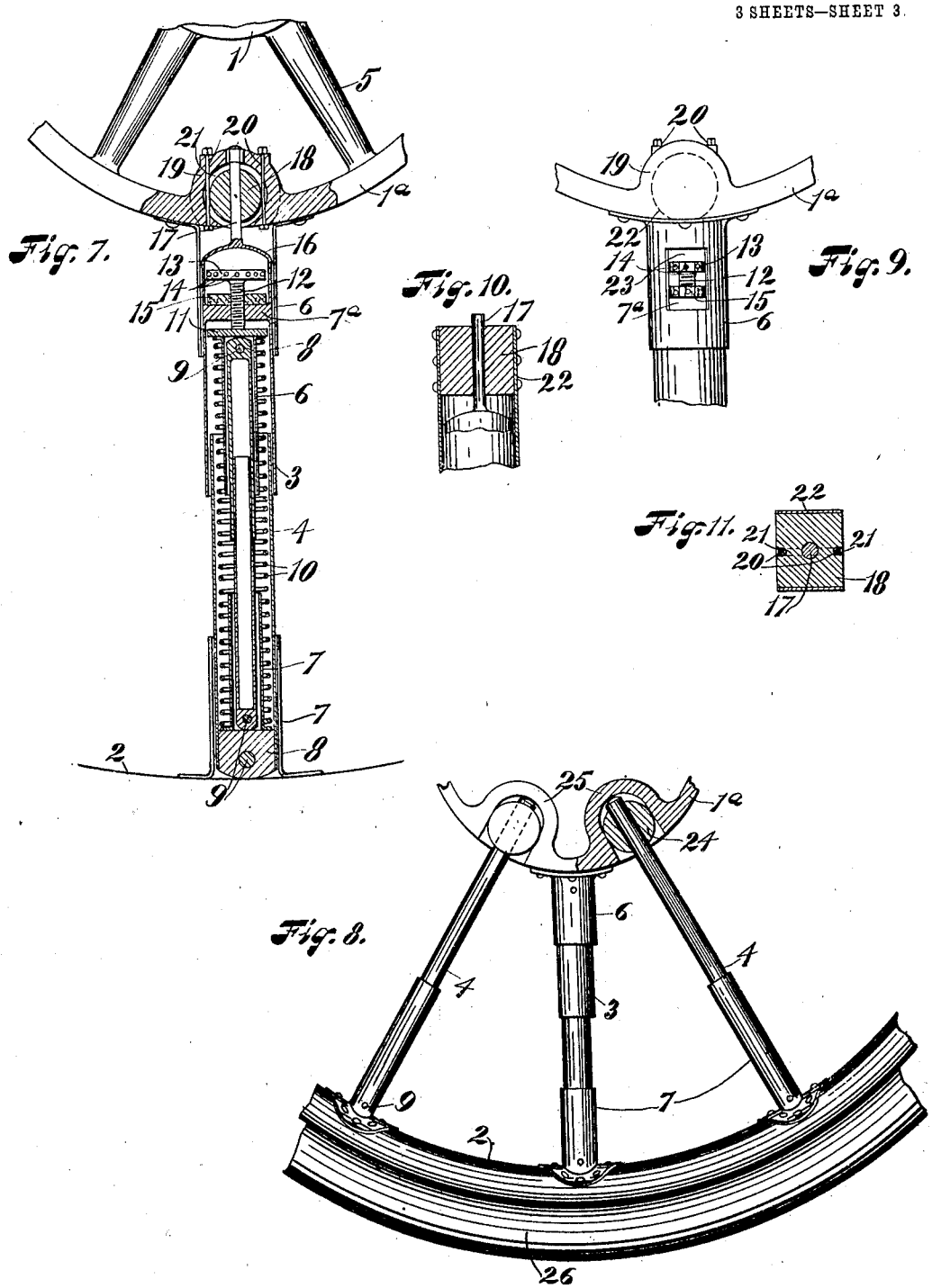

UNITED STATES PATENT OFFICE.

CHARLES J. MALINGS, OF ELYRIA, OHIO.

RESILIENT VEHICLE-WHEEL.

No. 871,351.　　　　　Specification of Letters Patent.　　　Patented Nov. 19, 1907.

Application filed July 30, 1906. Serial No. 328,302.

To all whom it may concern:

Be it known that I, CHARLES J. MALINGS, a citizen of the United States, residing at Elyria, in the county of Lorain and State of Ohio, have invented certain new and useful Improvements in Resilient Vehicle-Wheels, of which the following is a specification.

My invention relates to improvements in resilient vehicle-wheels, designed, primarily, for use in connection with automobiles, but the invention may be found valuable for use in connection with all kinds of vehicles,—such as buggies, wagons, bicycles, and the like.

The paramount object of the invention is to produce a generally improved wheel of this class adapted to take up the vibrations caused by the inequalities of the ground or surface over which it is passing, producing a running of a smoothness superior to the running of pneumatic tires without having the drawbacks of the latter.

Another object is to produce a resilient wheel which will be simple in construction, cheap of manufacture, efficient in use, and much better adapted to its intended purposes than any other device of the same class with which I am acquainted.

With these ends in view, the invention consists in the novel construction, arrangement, and combination of parts, hereinafter described, illustrated in the accompanying drawings, and particularly pointed out in the appended claims.

Figure 1:
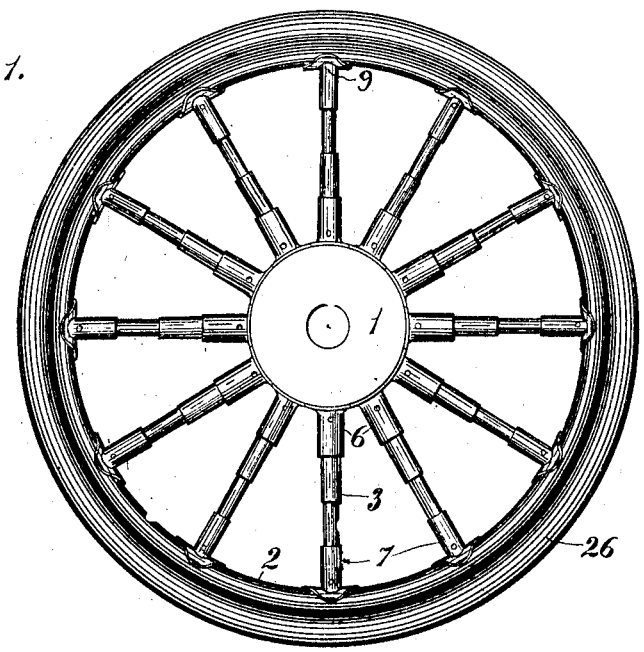
Figure 2:
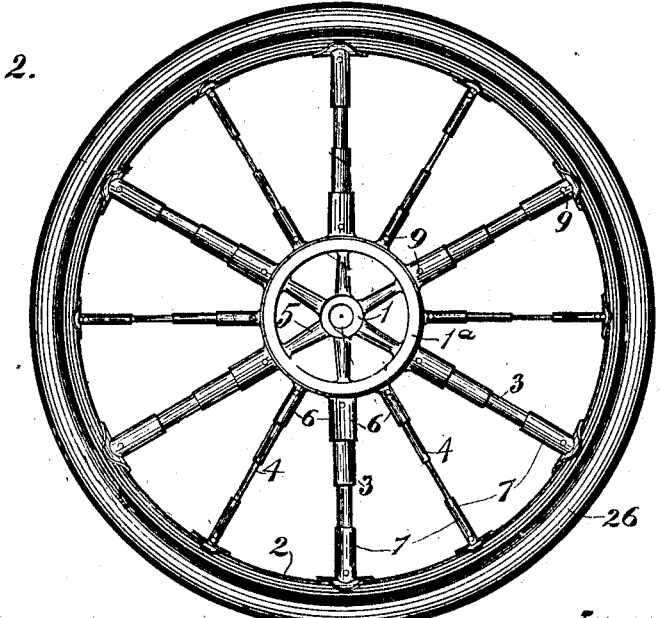

Referring to the accompanying drawings, forming a part of this specification, Figure 1, is a side elevation of a wheel embodying one form of my invention. Fig. 2, a similar view showing another form of my invention. Fig. 3, a view, partly in section and partly in elevation, of a portion of the form of wheel shown in Fig. 1, but having a solid hub. Fig. 4, a side elevation of a portion of the form of wheel shown in Fig. 2. Fig. 5, a transverse vertical sectional view, taken through Fig. 2, but showing the form of solid hub shown in Figs. 1, and 3. Fig 6, a detail view of guide-extensions or lugs for taking 'over the sides of the telescoping spokes at the rim or hub of the wheel. Fig. 7, a detail sectional view of a modified form of telescoping spoke. Fig. 8, a side elevation of a portion of a wheel, showing a modified form of attaching means for securing guide-spokes to the hub portion thereof. Fig. 9, a side elevation of the attaching and adjusting means for securing the ends of the telescoping spokes to the hub portion of the wheel of the form shown in Fig. 7. Fig. 10, a vertical sectional view of the pivoted hub portion shown in Figs. 7, and 9. Fig. 11, a transverse sectional view of the same. Fig. 12, a perspective view showing flat-sided guide-lugs.

Similar characters of reference designate like parts throughout all the figures of the drawings.

The improved wheel consists of a hub portion 1, and a rim or felly portion 2, connected and secured to each other by means of a series of radially-extending telescoping spring-resisted main spokes 3, and auxiliary or guide-spokes 4, hereinafter more fully described, the latter being preferably mounted and interposed between said spring-resisted main spokes 3.

The hub portion 1, may consist of one solid integral member as shown in Figs. 1, and 3, or may be provided with a second ring portion 1ª, secured to the main hub portion 1, by means of a series of integral radially-extending arms or spokes 5, as shown in Figs. 2, 3, 4, and 7, of the drawings A series of radially and outwardly-extending guide-extensions or lugs 6, are secured to or formed integral with the outer periphery of the second wing portion 1ª, of the hub portion or directly to the solid integral hub member 1; and inwardly-extending guide extensions or lugs 7, are similarly secured to the inner periphery of the rim or felly portion 2.

The telescoping main spokes 3, and auxiliary or guide-spokes 4, are each made up of two tubular members having their open ends telescoping or taking into and over each other and carrying at their opposite or closed ends bearing-blocks 8, adapted to abut against the outer and inner peripheries of the hub and rim portions, respectively, of the wheel, and, preferably, resting within the guide-extensions or lugs 6, and 7, and secured thereto by means of pivots, 9, as shown.

The tubular telescoping members of the guide-spokes 4, are, preferably, arranged in pairs, intermediate the main spokes 3, as shown in Figs. 2, 3, 4, and 5, or, if desired, they may be arranged singly as shown in Fig. 8, or mounted within the tubular members of the main spokes 3, as shown in Fig. 7, of the drawings.

The tubular members of the main spokes 3, inclose a spiral spring 10, the ends of which abut against the bearing-blocks 8, thus pressing the members apart and all cooperating to keep the hub portion of the wheel at the center thereof under a strong spring-pressure.

When the auxiliary or guide-spokes 4, are placed inside the main spokes 3, as shown in Fig. 7, the spiral spring 10, surrounds the same, together with tubular guide-extensions or sockets 6, and 7; the guide-sockets 6, being secured to a movable block 11, adapted to be moved and adjusted by means of an adjusting-bolt 12, mounted in a block or head 7ª.

The bolt 12, is provided with a head 13, provided with openings 14, about its periphery, by means of which it may be moved by inserting therein a rod or key. A locknut 15, similar to the head 13, is mounted about the bolt 12, and rests upon the block or head 7ª, for the purpose of locking the bolt in any position to which it may be adjusted. The adjacent tubular member is provided with an extension or housing 16, terminating at its upper middle portion in a stem 17, secured in a pivot-block 18, mounted in a housing 19, of the outer ring portion 1ª of the hub by means of bolts 20, taking into an annular groove or recess 21, of the periphery of said pivot-block 18, as shown most clearly in Fig. 11, of the drawings.

The lateral sides of the pivot-block 18, and bearing 19, are inclosed, in the present instance, (see Figs. 10, and 11) by means of metallic plates 22, secured to the hub portion of the wheel in any suitable and convenient manner. Registering openings 23, are formed in one side of the housing 16, and inclosed portion, as shown in Fig. 9, affording access to the adjusting-bolt-head 13, and lock-nut 15.

In Fig. 8, I have shown a modified form of wheel in which one of the members of the guide-spokes is attached directly to the hub portion of the wheel, without the intervention of a guide-socket, being secured in a pivot-block 24, mounted in a housing 25, the end of the attached member abutting against the inner surface of the bearing or housing, as shown.

In Fig. 6, I have shown a cross-sectional view showing the guide-extensions or lugs for the spokes, same being integral with the rim or felly portion 2 (or may also be secured to the hub portion 1), at the lateral sides of the adjacent spoke member.

The solid tire 26, is secured to the rim or felly 2, in any suitable and convenient manner.

It will be observed that the radially and outwardly-extending guide-extensions or lugs 6, and the inwardly-extending guide extensions or lugs 7, connected to the hub and rim portions, respectively, of the wheel, are either in the form of concavo-convex guide plates or lugs, as shown in Fig. 6, or flat-sided guide-lugs, as shown in Fig. 12. The concavo-convex guide plates or lugs, are adapted to spring laterally in the case of any extended vertical movement of the hub caused by an extra load or stress, so that the spokes, lying at right angles to the line of movement and the intermediate spokes, are permitted to move on the pivots of the respective bearing-blocks.

From the foregoing description, taken in connection with the accompanying drawings, the operation and advantages of my invention will be readily understood.

Having thus described my invention, without having attempted to set forth all the forms in which it may be made or all the modes of its use, I declare that what I claim and desire to secure by Letters Patent, is—

1. A resilient vehicle-wheel, consisting of a hub and rim portion provided with a series of guide-lugs, and a series of telescoping spring-resisted spokes pivotally-mounted and secured within said guide-lugs.

2. A resilient vehicle-wheel, comprising a hub and rim portion, a series of guide-lugs secured thereto, a series of telescoping spokes pivotally-mounted and secured within said guide-lugs, and a series of coiled springs mounted within and inclosed by said spokes.

3. A wheel, comprising a hub and rim portion, a series of guide-lugs secured thereto, a series of telescoping main and guide-spokes pivotally-mounted within said guide-lugs, and a series of coiled springs mounted and inclosed by said main spokes.

4. A wheel, consisting of a hub and rim portion, a series of guide-lugs secured thereto, and a series of telescoping spring-resisted main spokes and guide-spokes pivotally-mounted within said guide-lugs, said guide-spokes being mounted intermediate said main spokes.

5. A wheel, consisting of a hub and rim portion, a series of guide-lugs secured thereto, and a series of telescoping guide-spokes and spring-resisted main spokes pivotally-mounted within said guide-lugs, said guide-spokes being arranged in pairs and mounted intermediate said main spokes.

6. A wheel, consisting of a hub and rim portion pivotally secured together by means of a series of telescoping spring-resisted main spokes, and a series of telescoping guide-spokes.

7. A wheel, consisting of hub and rim portions pivotally-connected by means of telescoping main spokes; and guide-spokes interposed between said main spokes.

8. In a wheel, the combination with a hub and rim portion, and a series of guide-extensions or lugs secured thereto; of a series of telescoping spokes pivotally-mounted within said guide-extensions or lugs.

9. In a wheel, the combination with a hub and rim portion, and a series of guide-lugs secured thereto; of a series of spring-resisted telescoping spokes pivotally-mounted within and secured to said guide-lugs.

10. In a wheel, the combination with a hub and rim portion provided with a series of guide-extensions or lugs; of a series of spokes each made up of two tubular members having their open ends telescoping and carrying at their opposite ends bearing-blocks pivotally-mounted within said guide-extensions or lugs.

11. In a wheel, the combination with the hub and rim portions thereof provided with a series of guide-lugs; of a series of spokes each made up of telescoping tubular members carrying bearing-blocks pivotally-mounted within said guide-sockets and abutting against the outer and inner peripheries of said hub and rim portions, respectively.

12. In a wheel, the combination with the hub and rim portions thereof provided with lugs; of a main spoke made up of two telescoping tubular members inclosing a coil spring and carrying bearing-blocks pivotally-mounted within said lugs, and a telescoping guide-spoke mounted within said main spoke.

13. In a wheel, the combination with a telescoping main spoke; of a telescoping guide-spoke mounted therein and surrounded by a spiral spring, a movable block abutting against the end of said spring and carrying a guide-socket taking over one of the members of said guide-spoke, a stationary block formed with one of the members of said main spoke, and an adjusting bolt mounted in said stationary block and abutting against said movable block.

14. In a wheel, the combination with a hub and rim portion, guide-lugs secured thereto, and a telescoping spring-resisted main spoke pivotally-mounted and secured within said guide-lugs; of a pivotally-mounted guide-spoke and a pair of guide-sockets mounted within said main spoke and surrounded by a spiral spring, a movable block secured to one of said pair of guide-sockets, a block or head mounted within one of the members of said main spoke, and an adjusting-bolt mounted in said block or head and adapted to move said movable block.

15. In a wheel, the combination with a spring-resisted pivotally-mounted telescoping main spoke; of a pivotally-mounted telescoping guide-spoke mounted therein, a movable guide-socket taking over one of the members of said guide-spoke and carrying a block or head, a stationary block mounted in one of the members of said main spoke, and an adjusting-bolt mounted in said stationary block and adapted to engage said block or head carried by said movable guide-socket.

16. A wheel, consisting of a hub and rim portion pivotally secured together by means of a series of spring-resisted main spokes, and a series of telescoping guide-spokes.

17. A wheel, consisting of hub and rim portions pivotally connected by means of a plurality of spring-resisted main spokes and telescoping two-part tubular guide-spokes.

18. A wheel, consisting of a hub and rim portion provided with a series of guide lugs, and a series of spokes each made up of two tubular members carrying a spring in their open ends and bearing-blocks at their opposite ends pivotally-mounted within said guide-lugs.

In testimony whereof I have signed my name to this specification in the presence of two subscribing witnesses.

CHARLES J. MALINGS.

Witnesses:
O. C. BILLMAN,
H. T. GETTINS.